United States Patent
Oh

(10) Patent No.: US 10,833,517 B2
(45) Date of Patent: Nov. 10, 2020

(54) CHARGING DEVICE FOR VEHICLE, VEHICLE, AND METHOD FOR CONTROLLING THE VEHICLE

(71) Applicants: HYUNDAI MOTOR COMPANY, Seoul (KR); KIA MOTORS CORPORATION, Seoul (KR)

(72) Inventor: Se Min Oh, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 71 days.

(21) Appl. No.: 16/180,654

(22) Filed: Nov. 5, 2018

(65) Prior Publication Data

US 2019/0199109 A1   Jun. 27, 2019

(30) Foreign Application Priority Data

Dec. 21, 2017   (KR) .......................... 10-2017-0177077

(51) Int. Cl.
| | |
|---|---|
| *H02J 7/00* | (2006.01) |
| *B60R 16/00* | (2006.01) |
| *H01R 25/00* | (2006.01) |
| *H01R 27/02* | (2006.01) |

(Continued)

(52) U.S. Cl.
CPC .......... *H02J 7/0027* (2013.01); *H01R 25/006* (2013.01); *H01R 27/02* (2013.01); *H02J 7/007* (2013.01); *H02J 7/00032* (2020.01); *H02J 7/00034* (2020.01); *H02J 7/00036* (2020.01); *H02J 7/0042* (2013.01); *H02J 7/0047* (2013.01); *H02J 7/14* (2013.01); *H02J 7/1423* (2013.01); *B60R 16/03* (2013.01); *H01R 2201/26* (2013.01); *H02J 7/00* (2013.01);

(Continued)

(58) Field of Classification Search
None
See application file for complete search history.

(56) References Cited

U.S. PATENT DOCUMENTS

| | | | |
|---|---|---|---|
| 7,002,265 B2 * | 2/2006 | Potega | H02J 7/00041 307/149 |
| 9,130,397 B2 * | 9/2015 | Leabman | H02J 50/40 |
| 9,356,454 B2 * | 5/2016 | Caren | H02J 7/0027 |

(Continued)

FOREIGN PATENT DOCUMENTS

| | | |
|---|---|---|
| KR | 10-2004-0049949 | 6/2004 |
| KR | 10-2007-0000277 | 1/2007 |

(Continued)

*Primary Examiner* — Leigh M Garbowski
(74) *Attorney, Agent, or Firm* — Brinks Gilson & Lione

(57) ABSTRACT

The present disclosure provides charging devices for vehicles, vehicles including the same, and methods of controlling the vehicles. In one form of the present disclosure, a remote control device includes a charging device for a vehicle, the charging device includes a plurality of chargers installed in the vehicle, a communication device provided in each charger of the plurality of chargers and configured to receive information regarding a charging capacity of an electronic device connected to the plurality of chargers from the electronic device and a controller configured to determine charging capacities allocated to the plurality of chargers based on the information regarding the charging capacity of the electronic device.

14 Claims, 8 Drawing Sheets

(51) Int. Cl.
*H02J 7/14* (2006.01)
*B60R 16/03* (2006.01)

(52) U.S. Cl.
CPC ....... *H02J 2310/40* (2020.01); *H02J 2310/48* (2020.01); *H02J 2310/50* (2020.01)

(56) References Cited

U.S. PATENT DOCUMENTS

| | | | | |
|---|---|---|---|---|
| 9,744,858 B2* | 8/2017 | Hall | | H02J 5/005 |
| 9,774,685 B2* | 9/2017 | Narita | | H04L 67/12 |
| 9,819,202 B2* | 11/2017 | Caren | | H04M 1/04 |
| 9,948,118 B1* | 4/2018 | Patton | | H02J 7/0045 |
| 9,960,624 B2* | 5/2018 | Ibrahim | | H02J 7/007 |
| 2009/0100275 A1* | 4/2009 | Chang | | H02J 7/007 |
| | | | | 713/300 |
| 2010/0299464 A1* | 11/2010 | Cullum | | G06F 13/387 |
| | | | | 710/63 |
| 2014/0091623 A1* | 4/2014 | Shippy | | H02J 7/342 |
| | | | | 307/31 |
| 2014/0103862 A1 | 4/2014 | Ahn et al. | | |
| 2014/0265555 A1* | 9/2014 | Hall | | B60L 58/12 |
| | | | | 307/9.1 |
| 2015/0084584 A1* | 3/2015 | Monks | | H02J 7/0027 |
| | | | | 320/108 |
| 2015/0142993 A1* | 5/2015 | Blanc | | G06F 13/387 |
| | | | | 710/16 |
| 2016/0218536 A1 | 7/2016 | Caren et al. | | |
| 2016/0336745 A1* | 11/2016 | Pandya | | H02J 7/0068 |
| 2017/0256965 A1 | 9/2017 | Clark | | |
| 2019/0346900 A1* | 11/2019 | Hutchings | | H01R 24/62 |

FOREIGN PATENT DOCUMENTS

| | | |
|---|---|---|
| KR | 10-1233820 | 1/2011 |
| KR | 10-1584166 | 7/2015 |
| KR | 20-0479833 | 8/2015 |
| KR | 10-1556058 | 9/2015 |

* cited by examiner

CHARGING DEVICE FOR VEHICLE, VEHICLE, AND METHOD FOR CONTROLLING THE VEHICLE

CROSS-REFERENCE TO RELATED APPLICATION(S)

The present application claims priority to and the benefit of Korean Patent Application No. 10-2017-0177077, filed on Dec. 21, 2017, which is incorporated by reference in its entirety.

FIELD

The present disclosure relate to charging devices for vehicles, vehicles including the same, and methods of controlling the vehicles.

BACKGROUND

The statements in this section merely provide background information related to the present disclosure and may not constitute prior art.

In general, most of electronic devices need to be charged. In this regard, there is an increasing demand for charging electronic devices inside vehicles. In recent years, vehicles tend to support multi-charge ports to provide users with a convenient charging environment in vehicles.

In this regard, use of four or more charging ports installed around seats in the second and third rows is on a spreading trend in recent years in comparison with a conventional environment supporting one or two charging ports. As the number of charging ports increases, the convenience of users is improved. However, manufacturing costs of vehicles may increase in proportion thereto, more package considerations may be required in accordance with the increase in the number of charging ports, and charging ports not in use may degrade efficiency thereof as opposed to the increase in the number of charging ports.

SUMMARY

Therefore, it is an aspect of the present disclosure to provide charging devices for vehicles configured to provide a plurality of charging ports and efficiently manage charging capacity provided to the plurality of charging ports, vehicles including the same, and methods of controlling the vehicles.

Additional aspects of the disclosure will be set forth in part in the description which follows and, in part, will be obvious from the description, or may be learned by practice of the disclosure.

In accordance with one aspect of the present disclosure, a remote control device includes a charging device for a vehicle, the charging device includes a plurality of chargers installed in the vehicle, a communication device provided in each of the chargers and configured to receive information on a charging capacity of an electronic device connected to the charger from the electronic device and a controller configured to determine charging capacities respectively allocated to the plurality of chargers based on the information on the charging capacity received from the communication device.

The controller may determine charging capacities allocated to chargers in use among the plurality of chargers when determining the charging capacities allocated to the plurality of chargers.

The controller may determine the charging capacities allocated to the chargers in use based on charging capacities of electronic devices connected to the chargers in use and a total charging capacity of the charging device.

The controller may determine charging capacities of the chargers in use based on the total charging capacity of the charging device to allow a sum of the charging capacities allocated to the chargers in use not to exceed the total charging capacity of the charging device wherein in a state where charging capacities are allocated to one or more chargers among the plurality of chargers, when another electronic device is additionally connected to another charger.

The controller may determine charge capacities allocated to the plurality of chargers based on the charging capacities of the electronic devices when the sum of the charging capacities of the electronic devices connected to the plurality of chargers does not exceed the total charging capacity of the charging device and determine charging capacities allocated to the chargers in use based on the total charging capacity of the charging device to allow the sum of the charging capacities allocated to the chargers in use not to exceed the total charging capacity of the charging device when the sum of the charging capacities of the electronic devices connected to the plurality of chargers exceeds the total charging capacity of the charging device.

The controller may determine the charging capacities allocated to the chargers in use according to installation positions of the chargers in use.

The controller may determine the charging capacities allocated to the chargers in use in proportion to the charging capacities of the electronic devices connected to the chargers in use.

The controller may determine a predetermined capacity as the charging capacities allocated to the chargers in use.

The controller may determine a charging capacity of a charger with a priority among the chargers in use and determine a predetermined capacity as a charging capacity of remaining chargers as the predetermined capacity.

The controller may select charging capacities in consideration of the total charging capacity of the charging device within ranges of charging capacities supported by the electronic devices connected to the chargers in use and determine the charging capacities allocated to the chargers in use.

The controller may collect information on a battery capacity of the vehicle and adjust the total charge capacity of the charging device based on the information on the battery capacity of the vehicle.

The controller may adjust the total charging capacity of the charging device corresponding to the information on the battery capacity of the vehicle.

In accordance with another aspect of the present disclosure, a vehicle provided with a charging device for vehicles, wherein the charging device for vehicles include a plurality of chargers installed in the vehicle, a communication device may communicate with an electronic device connected to each of the chargers and a controller may determine charging capacities allocated to chargers in use among the plurality of chargers based on charging capacities of electronic devices connected to the chargers.

The controller may determine the charging capacity allocated the chargers in use among the plurality of chargers based on the charging capacities of the electronic devices connected to the plurality of chargers and a total charging capacity of the charging device.

In accordance with another aspect of the present disclosure, a method of controlling a vehicle provided with a plurality of chargers therein, the method include receiving information on charging capacities of electronic devices connected to the plurality of chargers from the electronic devices and determining charging capacities allocated to chargers in use among the plurality of chargers based on the received information on the charging capacities.

The determining of the charging capacities allocated to the charger in use among the plurality of chargers based on the received information on the charging capacities may include determine charging capacities allocated to chargers in use among the plurality of chargers based on charging capacities of electronic devices connected to the plurality of chargers and a total charging capacity of the charging device.

The determining of the charging capacities allocated to the chargers in use among the plurality of chargers based on the received information on the charging capacities may include in a state where a charging capacity is allocated to one charger among the plurality of chargers, when another electronic device is connected to another charger, determining charging capacities of chargers in use based on the total charging capacity of the charging device to allow a sum of the charging capacities allocated to the chargers in use not to exceed the total charging capacity of the charging device.

The method of controlling a vehicle provided with a plurality of chargers therein include collecting information on a battery capacity of the vehicle and adjusting the total charging capacity of the charging device based on the collected information on the battery capacity of the vehicle.

The adjusting of the total charging capacity of the charging device based on the collected information on the battery capacity of the vehicle may include adjusting the total charging capacity of the charging device in proportion to the collected information on the battery capacity of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
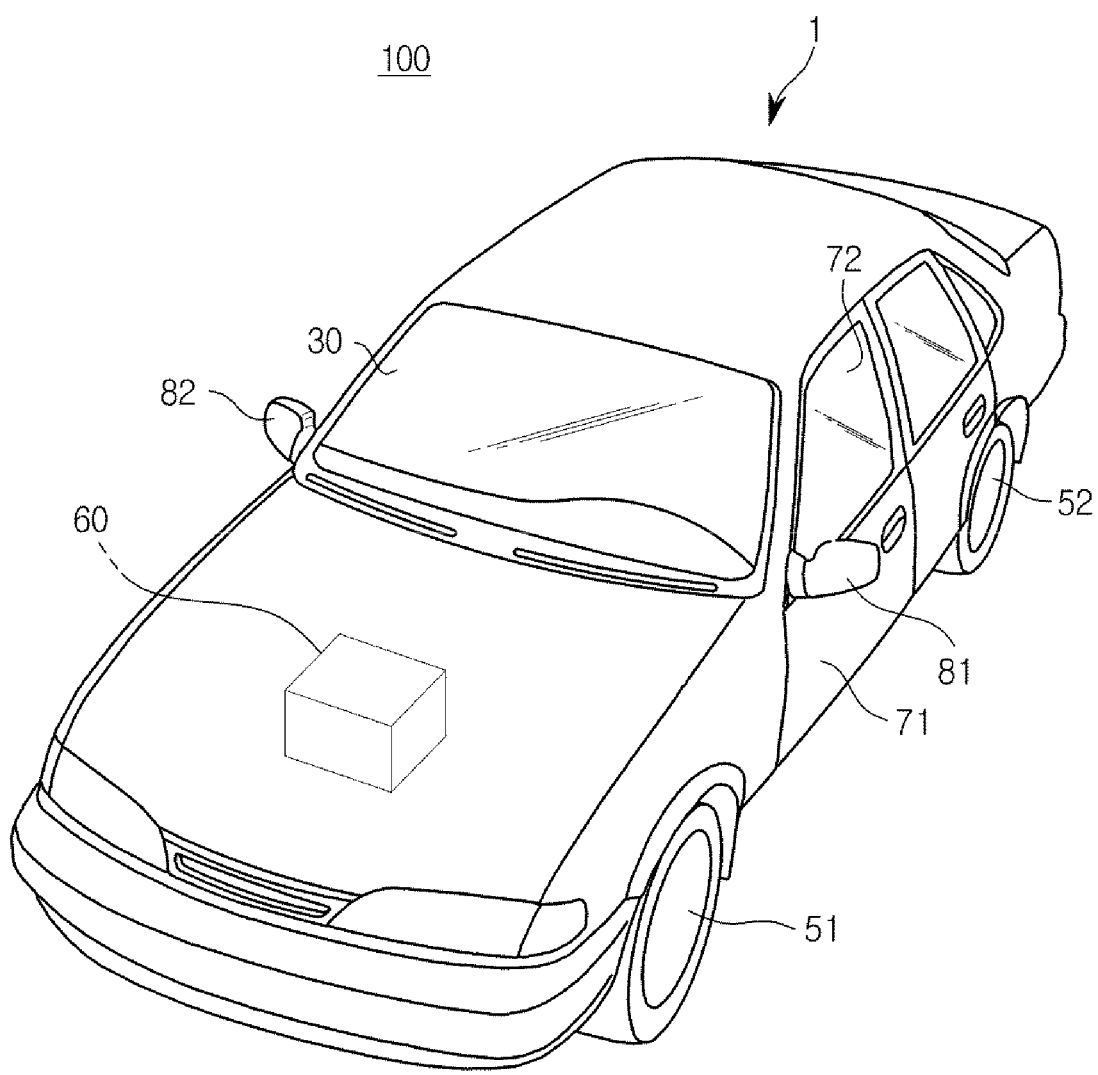
FIG. 1 is an exterior view of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to some forms of the present disclosure, examples of which are illustrated in the accompanying drawings, wherein like reference numerals refer to like elements throughout. This specification does not describe all elements of the forms of the present disclosure and detailed descriptions on what are well known in the art or redundant descriptions on substantially the same configurations may be omitted. The terms 'unit', 'module', 'member', or 'block' used in the specification may be implemented using a software or hardware component. In some forms of the present disclosure, a plurality of 'units', 'modules', 'members', or 'blocks' may also be implemented using an element or one 'unit', 'module', 'member', or 'block' may include a plurality of elements.

Throughout the specification, when an element is referred to as being 'connected to' another element, it may be directly or indirectly connected to the other element and the 'indirectly connected to' includes connected to the other element via a wireless communication network.

Also, it is to be understood that the terms 'include' or 'have' are intended to indicate the existence of elements disclosed in the specification, and are not intended to preclude the possibility that one or more other elements may exist or may be added.

The terms 'first', 'second' etc. are used to distinguish one component from other components and, therefore, the components are not limited by the terms.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

The present disclosure relates to a charging device for vehicles, a vehicle, and a method of controlling the vehicle, particularly, to a charging device for vehicles capable of efficiently managing charging capacities of chargers installed in a vehicle respectively, a vehicle, and a method of controlling the vehicle.

The charging device for vehicles may be installed inside the vehicle. Descriptions of the vehicle may include those of the charging device for vehicles and the same descriptions will be omitted.

Hereinafter, operating principles and forms of the present disclosure will be described with reference to the accompanying drawings. A structure of a vehicle will be described first and then the operating principles will be described to aid understandings of some forms of the present disclosure.

FIG. 1 is an exterior view of a vehicle 100 in some forms of the present disclosure.

Referring to FIG. 1, the vehicle 100 may include a body 1 configured to define an appearance of the vehicle 100, a front glass 30 configured to provide a driver in the vehicle 100 with views in front of the vehicle 100, wheels 51 and 52 configured to move the vehicle 100, a driving apparatus 60 configured to rotate the wheels 51 and 52, doors 71 configured to shield the inside of the vehicle 100 from the outside, and side mirrors 81 and 82 configured to provide the driver with views behind the vehicle 100.

The front glass 30 is located at a front upper portion of the body 1 to allow the driver inside the vehicle 100 to acquire visual information of views in front of the vehicle 100 and is also called a windshield glass.

The wheels 51 and 52 include front wheels 51 located at front portions of the vehicle 100 and rear wheels 52 located at rear portions of the vehicle 100. The driving apparatus 60 may provide a rotational force to the front wheels 51 or the rear wheels 52 to move the body 1 forward or backward. The driving apparatus 60 may include an engine configured to generate a rotational force via combustion of a fossil fuel or a motor configured to generate a rotational force upon receiving electric power from a battery (not shown).

The doors 71 are pivotally coupled to the vehicle 100 at left and right sides of the body 1 to allow a driver to get into the vehicle 100 by opening the door and the inside of the vehicle 100 may be shielded from the outside by closing the doors. The doors 71 may be provided with windows 72 through which the inside is visible from the outside or vice versa. The windows 72 may be provided to be viewed only from one side or may be opened or closed.

The side mirrors 81 and 82 include a left side mirror 81 located at the left side of the body 1 and a right side mirror 82 located at the right side of the body 1 and allow the driver inside the vehicle 100 to acquire visual information of areas beside and behind the vehicle 100.

Figure 2:
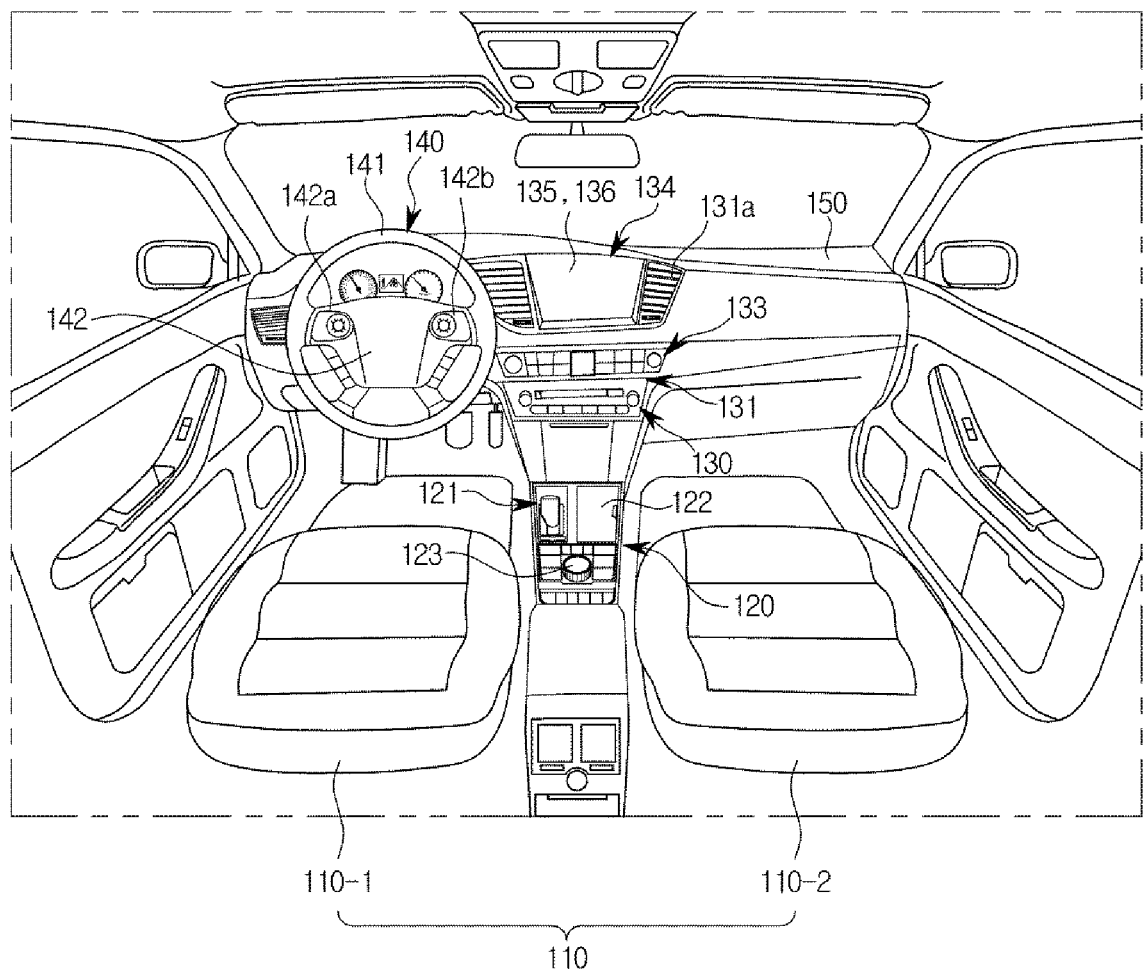
FIG. 2 is an interior view of the vehicle in one form of the present disclosure.

FIG. 2 is an interior view of the vehicle 100 in some forms of the present disclosure.

Referring to FIG. 2, the vehicle 100 may include seats 110, a gear box 120, and a dashboard 150 provided with a center fascia 130 and a steering wheel 140.

The gear box 120 may be provided with a transmission lever 121 for transmission of the vehicle 100 and a touch pad 122 configured to control functions of the vehicle 100. Meanwhile, a dial controller 123 may further be provided, if required.

The center fascia 130 may be provided with an air conditioner 131, a clock 132, an audio device 133, an audio, video, and navigation (AVN) device 134, and the like.

The air conditioner 131 maintains the interior of the vehicle 100 in a clean state by adjusting temperature, humidity, and cleanness of air inside the vehicle 100. The air conditioner 131 may include at least one air vent 131a installed at the center fascia 130 through which air is discharged. The center fascia 130 may be provided with a button, dial, or the like to control the air conditioner 131 or the like. A user such as the driver may control the air conditioner 130 by using the button located at the center fascia 130.

The clock 132 may be provided around the button or dial to control the air conditioner 131.

The audio device 133 may include a control panel provided with a plurality of buttons to perform functions of the audio device 133. The audio device 133 may provide a radio mode to provide radio functions and a media mode to reproduce audio files stored in various storage media.

The AVN device 134 may be embedded in the center fascia 130 of the vehicle 100. The AVN device 134 is a device capable of synthetically performing audio functions, video functions, and navigation functions in accordance with a user's control. The AVN device 134 may include an input device 135 configured to receive a user command with respect to the AVN device 134 and a display 136 configured to display screens related to audio, video, and navigation functions.

The steering wheel 140 that is a device configured to control a driving direction of the vehicle 100 may include a rim 141 gripped by the driver and a spoke 142 connected to a steering apparatus of the vehicle 100 and connecting the rim 141 with a hub of a rotating shaft for steering. In some forms of the present disclosure, the spoke 142 may be provided with control devices 142a and 142b to control various devices, e.g., the audio device 133.

The dashboard 150 may further be provided with an instrument cluster to display a driving speed of the vehicle 100, an engine RPM, a fuel level, or the like and a glove box for miscellaneous storage.

A plurality of chargers may be installed in the vehicle 100 as described above for the convenience of users.

Figure 3:
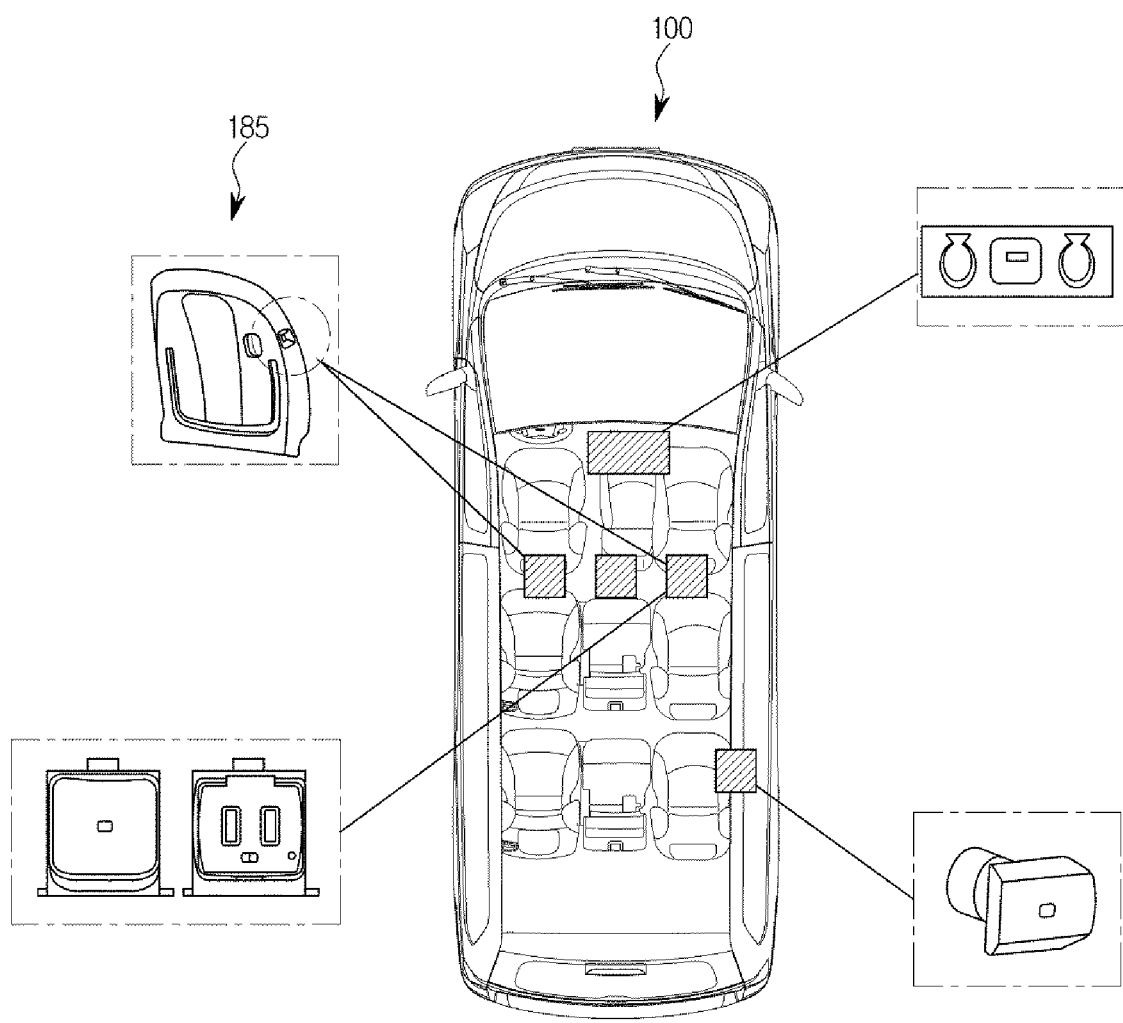
FIG. 3 is a diagram exemplarily illustrating positions inside a vehicle where installation of chargers is available.

FIG. 3 is a diagram exemplarily illustrating positions inside a vehicle where installation of chargers is available.

Referring to FIG. 3, the chargers may be installed at seats 110, the gear box 120, the center fascia 130, or inner regions of the rear doors.

For examples, chargers 185 may be installed at a driver's seat 110-1 or a front passenger's seat 110-2, at a center console region around the gear box 120, at a position around the center fascia 130 as a multi-charge ports, or at inner sides of rear doors in the vehicle. Meanwhile, installation positions of the chargers 185 are not limited to those shown in FIG. 3 and the chargers 185 may also be installed at various positions inside the vehicle according to the intention of a designer.

The chargers 185 may include chargers 185 provided in the form of USB charging ports and charged in a wired manner and may be understood as a concept including chargers charged in a wireless manner in accordance with installation positions thereof in the vehicle. Hereinafter, USB charging ports will be described as the chargers in some forms of the present disclosure by way of example for descriptive convenience.

Figure 4:
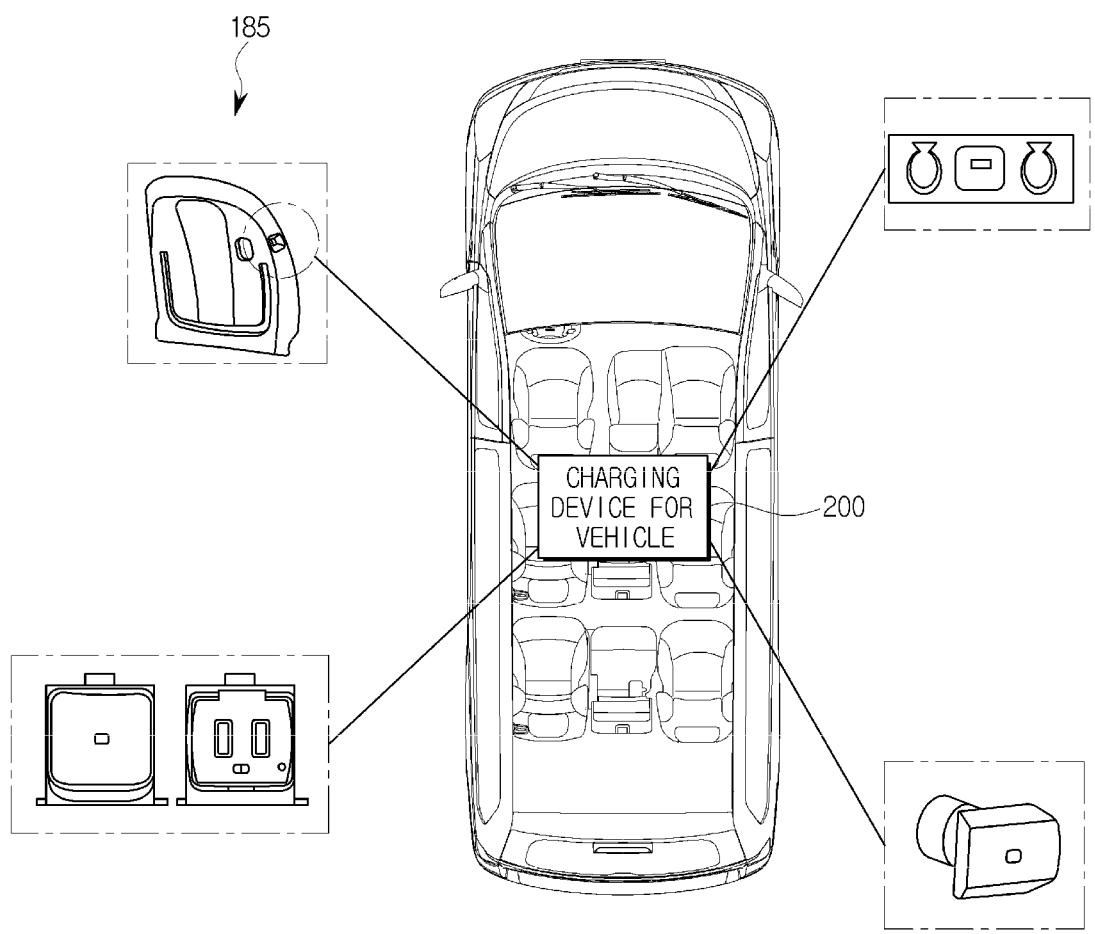
FIG. 4 is a diagram exemplarily illustrating a charging device for vehicles applied to a vehicle in one form of the present disclosure.

FIG. 4 is a diagram exemplarily illustrating a charging device for vehicles applied to a vehicle in some forms of the present disclosure.

A charging device 200 for vehicles in some forms of the present disclosure may be installed inside the vehicle 100 as illustrated in FIG. 4 to manage a plurality of chargers 185 installed in the vehicle 100. In this regard, the plurality of chargers 185 may have the same charging capacity or different charging capacities according to installation positions depending on the designer's intention. Here, the charging capacity refers to a charging capacity basically allocated a charger and may be adjusted depending on situation in consideration of a charging capacity required to charge an electronic device connected to the chargers 185 and a total charging capacity of the charging device.

Hereinafter, some forms of the present disclosure will be described in more detail with reference to the drawings.

Figure 5:
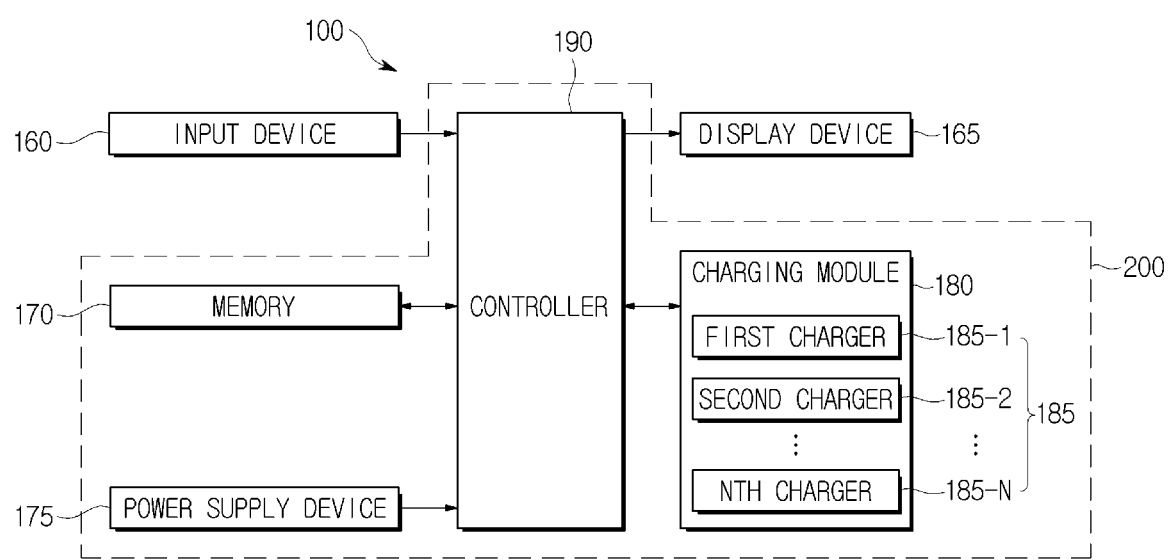
FIG. 5 is a control block diagram of the vehicle in one form of the present disclosure.

FIG. 5 is a control block diagram of the vehicle 100 according to an form. The charging device 200 for vehicles in some forms of the present disclosure is a component installed in the vehicle 100. Among all components of the vehicle 100 illustrated in FIG. 5, components shown inside a dashed line may serve as main components of the charging device 200 for vehicles. Descriptions of the vehicle 100 which will be described below may include those of the charging device 200 for vehicles.

Referring to FIG. 5, the vehicle 100 in some forms of the present disclosure includes an input device 160, a display device 165, a memory 170, a power supply device 175, a charging module 180, and a controller 190.

The input device 160 is configured to receive commands to control the vehicle 100 from user. The input device 160 may include various control buttons installed in the vehicle 100. The input device 160 may include a graphic user interface (GUI) such as a touch pad, i.e., a software device. The touch pad may be implemented using a touch screen panel (TSP) to constitute a layered structure with the display device 165 which will be described later.

The display device 165 may display operation information on various functions provided in the vehicle 100 including charging information on the plurality of chargers installed in the vehicle 100. For example, the display device 165 may display operation information, charging rates, or the like of the plurality of chargers on the basis of location, and may simultaneously display the information when charging is completed.

The memory 170 may store a variety of data, programs, or applications to control various functions provided in the vehicle 100 under the control of the controller 190. More particularly, the memory 170 may store a variety of data, programs, or applications to control the charging device 200 for vehicles installed in the vehicle 100.

For example, the memory 170 may store programs to determine charging capacities allocated to a plurality of chargers provided in the charging module 180 based on information on charging capacities of electronic devices connected to the charging module 180 of the charging device 200 for vehicles. Also, the memory 170 may store various data to execute the programs, e.g., information on charging capacities on the basis of installation positions, information on minimum charging capacities, information on charging capacities of electronic devices received from the electronic devices, and information on a remaining capacity of a battery of the vehicle 100.

The memory 170 may be implemented using at least one of non-volatile memory such as Cache, Read Only Memory (ROM), Programmable ROM (PROM), Erasable Programmable Read Only Memory (EPROM), Electrically Erasable Programmable Read Only Memory (EEPROM), and flash memory, volatile memory such as Random Access Memory (RAM), and a storage medium such as Hard Disk Drive (HDD), and CD-ROM, without being limited thereto. The memory 170 may be a memory implemented as a separate chip from the processor described above with reference to the controller 190 or a single chip integrated with the processor.

The power supply device 175 supplies the power to components of the vehicle 100 under the control of the controller 190. The power supply device 175 may allow the electronic devices connected to the chargers 185 to be charged via the plurality of chargers 185 provided in the vehicle 100. The power supply device 175 may be understood as a concept including a battery for vehicles installed in the vehicle 100.

The charging module 180 may be understood as a concept including components used for charging of the charging device 200 for vehicles. The charging module 180 may include the plurality of chargers 185 and a communication device, although not shown herein, provided at the plurality of chargers 185 and configured to receive information on charging capacities of the electronic devices connected to the plurality of chargers from the electronic devices.

The plurality of chargers may include a first charger 185-1, a second charger 185-2, and a Nth charger 185-N (where N is an integer of 3 or greater). The plurality of chargers may be installed at various positions inside the vehicle 100, and descriptions given above with reference to FIG. 3 will not be repeated.

The communication device receives information on a charging capacity of an electronic device connected to a charger from the electronic device and transmits the information on the charging capacity allocated to the charger by the controller 190 to the electronic device. The communication device may be understood as a concept including a communication pin of a USB connector when the charger is provided as a USB charger. When the charger is provided in a form other than the USB charger, the communication device may be provided in a corresponding form.

The controller 190 controls the overall operation of the vehicle 100. The controller 190 may control the components of the vehicle 100, i.e., the input device 160, the display device 165, the memory 170, the power supply device 175, the charging module 180, and the like. The controller 190 may include various processors including at least one chip on which an integrated circuit is formed.

The controller 190 may be implemented using the memory 170 that stores algorithms to control the operation of the components of the vehicle 100 or data on programs to run the algorithms and a processor that performs the aforementioned operation by using data stored in the memory 170. In this case, the memory 170 and the processor may be implemented as separate chips or as a single chip.

The controller 190 may determine charging capacities allocated to the plurality of chargers based on the information on charging capacities of the electronic devices received from the communication device of the charging module 180. Particularly, the controller 190 may determine charging capacities allocated to chargers in use among the plurality of chargers. In this regard, the chargers in use refer to chargers to which external electronic devices being charged are connected. When the controller 190 determines a charging capacity allocated to a charger, specifications of the charger may be considered together with information on a charging capacity of an electronic device. For example, when USB chargers are used as the chargers, the USB chargers may support charge capacities of 15 W (5 V, 3 A), 27 W (9 V, 3 A), 60 W (12 V, 5 A), and 100 W (20 V, 5 A). When an electronic device is connected to each of the chargers, the controller 190 may receive a charge capacity applicable to the electronic device according to specifications of the charger and determine a charging capacity allocated to the charger.

The controller 190 may determine charging capacities allocated to the plurality of chargers based on a total charging capacity of the charging device together with charging capacities of the electronic devices connected to the plurality of chargers. For example, in a state where charging capacities are allocated to one or more of the plurality of chargers, when another electronic device is connected to another charger, the controller 190 may determine charging capacities allocated to chargers in use based on the total charging capacity of the charging device such that a sum of the charging capacities allocated to the chargers in use does not exceed the total charging capacity.

When the sum of the charging capacities of the electronic devices connected to the plurality of chargers does not exceed the total charging capacity of the charging device, the controller 190 may determine charging capacities allocated to the plurality of chargers based on the charging capacities of the electronic devices as described above. On the contrary, when the sum of the charging capacities of the electronic devices connected to the plurality of chargers exceeds the total charging capacity of the charging capacity, the controller 190 may determine charging capacities allocated to the chargers in use based on the total charging capacity such that the sum of the charging capacities allocated to the chargers in use does not exceed the total charging capacity of the charging device.

Figure 6:
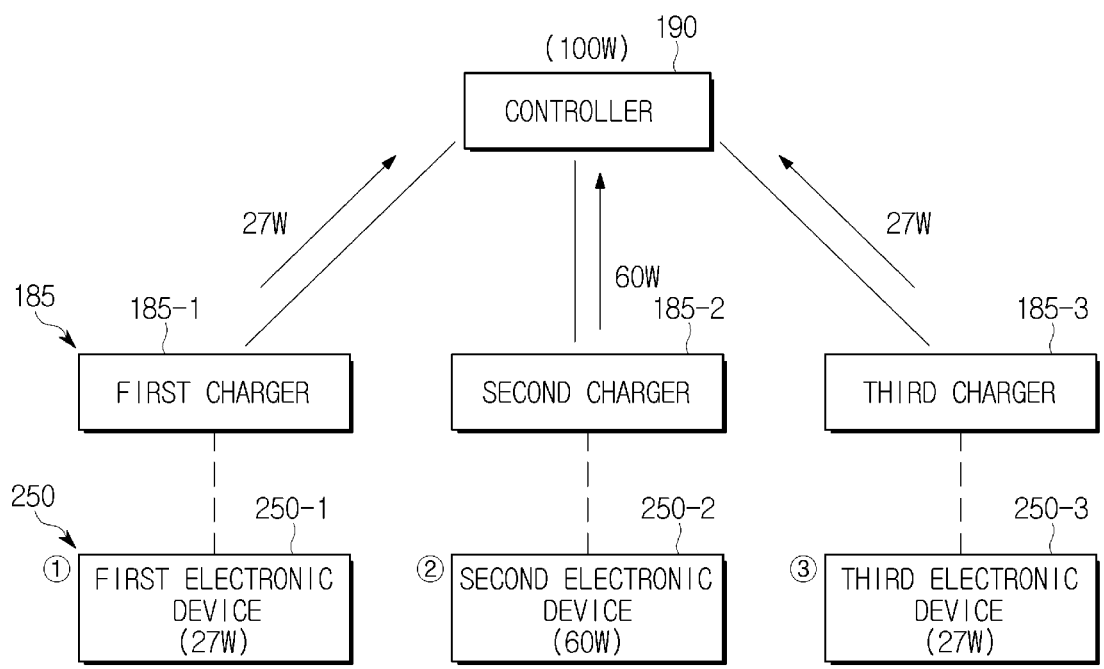
FIG. 6 is a diagram for describing a process of determining charging capacities performed by the controller.

FIG. 6 is a diagram for describing a process of determining charging capacities performed by the controller.

Referring to FIG. 6, a process of determining charging capacities allocated respectively to a plurality of chargers 185 (first to third chargers 185-1, 185-2, and 185-3) performed by the controller 190 in the case where electronic devices 250 (first to third electronic devices 250-1, 250-2, and 250-3) are sequentially connected to the chargers 185 (first to third chargers 185-1, 185-2, and 185-3) will be described.

On the premise that a total charging capacity of the charging device is 100 W, when the first electronic device 250-1 supporting a charging capacity of 27 W is connected to the first charger 185-1, the first charger 185-1 transmits information on the charging capacity of the first electronic device 250-1 of 27 W to the controller 190. Upon determination that the charging capacity of 27 W supported by the first electronic device 250-1 may be output by comparing the charging capacity of 27 W with the total charging capacity of the charging device of 100 W, the controller 190 may output the charging capacity of 27 W supported by the first electronic device 250-1.

Next, for example, when the second electronic device 250-2 supporting a charging capacity of 60 W is connected to the second charger 185-2, the second charger 185-2 transmits information on the charging capacity of the second electronic device 250-2 of 60 W to the controller 190. Since the charging capacity allocated to the first charger 185-1 in use is 27 W and the charging capacity supported by the second electronic device 250-2 is 60 W, a sum of the power output is 87 W even after the charging capacity of 60 W is allocated to the second electronic device 250-2, and the sum is less than the total charging capacity of the charging device of 100 W. Thus, the controller 190 may output the charging capacity of 60 W supported by the second electronic device 250-2.

Next, for example, when the third electronic device 250-3 supporting a charging capacity of 27 W is connected to the third charger 185-3, the third charger 185-3 transmits information on the charging capacity of the third electronic device 250-3 of 27 W to the controller 190. Since the charging capacity allocated to the first and second chargers 185-1 and 185-2 in use is 87 W, a sum of the charging capacities of the first to third charging capacities 185-1, 185-2, and 185-3 exceeds the total charging capacity of the charging device in the case where 27 W is allocated to the third charger 185-3. Thus, the controller 190 adjusts charging capacities allocated to the chargers in use such that the sum of the charging capacities of the first to third charging capacities 185-1, 185-2, and 185-3 does not exceed the total charging capacity of the charging device of 100 W.

A method of determining charging capacities allocated to the chargers in use performed by the controller 190 will be described. Hereinafter, the method of determining charging capacities will be described with reference to FIG. 6 for better understandings thereof.

First, the controller 190 may determine charging capacities allocated to chargers in use according to installation positions of the chargers in use. Specifically, the controller 190 may preferentially allocate a charging capacity to a charger installed at a predetermined position in accordance with the installation positions of the first to third chargers 185-1, 185-2, and 185-3. For example, in the case where the controller 190 divides the vehicle 100 into a plurality of zones including a first zone, a second zone, and a third zone, the first to third chargers 185-1, 185-2, and 185-3 are respectively installed in the first to third zones, and priorities are assigned in the order of the first to third zones, the controller 190 may assign a highest priority to the first charger 185-1 installed in the first zone allocating the charging capacity of 27 W to the first charger 185-1 and assign a second highest priority to the second charger 185-2 allocating the charging capacity of 60 W to the second charger 185-2. Lastly, the controller 190 may assign a lowest priority to the third charger 185-3 allocating a charging capacity supported by the third electronic device 250-3 to the third charger 185-3 within the limit of the remaining charging capacity of 13 W. In some forms of the present disclosure, when there is no charging capacity supported by the third electronic device 250-3 under 13 W, the third charger 185-3 may not support the charging capacity.

In this case, the priority may be determined in the order in which devices are connected to ports. Thus, the controller 190 may assign the priorities to chargers connected to electronic devices according to the order in which the electronic devices are connected to charging ports or may preferentially assign a charging capacity to a charger to which an electronic device is connected first.

Alternatively, the controller 190 may determine charging capacities allocated to chargers in use in proportion to charging capacities of electronic devices connected to the chargers in use. For example, the controller 190 may determine charging capacities allocated to the first to third chargers 185-1, 185-2, and 185-3 respectively in proportion to charging capacities of 27 W, 60 W, and 27 W respectively supported by the first to third electronic devices 250-1, 250-2, and 250-3.

Alternatively, the controller 190 may determine a predetermined capacity as a charging capacity allocated to chargers in use. In this case, the predetermined capacity may refer to a predetermined minimum charging capacity. In other words, the controller 190 may determine a minimum charging capacity (e.g., 15 W) for each of the first to third chargers 185-1, 185-2, and 185-3 and allocate the predetermined minimum charging capacity of 15 W to each of the first to third chargers 185-1, 185-2, and 185-3.

Alternatively, the controller 190 may determine a charging capacity of one charger with a highest priority first among chargers in use and then determine a predetermined capacity as a charging capacity of the other chargers. For example, when an electronic device requiring a high capacity, such as a laptop or notepad, is mainly used around seats in a second row, a highest charging capacity, e.g., 60 W, may be allocated to the second charger 185-2 located around the seats in the second row and a highest priority is assigned thereto, and then a minimum charging capacity of 15 W may be allocated to the other first and third chargers 185-1 and 185-3. According to an form, the remaining charging capacity may also be allocated to the first and third chargers 185-1 and 185-3 in proportion to the charging capacities of electronic devices respectively connected to the first and third chargers 185-1 and 185-3 or at a predetermined ratio.

In this case, the priority may also be determined in the order in which devices are connected to ports. Thus, the controller 190 may assign the priority to chargers including charging ports connected to electronic devices according to the order in which the electronic devices are connected to charging ports and may preferentially assign a highest charging capacity to a charger to which an electronic device is connected first.

Alternatively, the controller 190 may select charging capacities of chargers in consideration of a total charging capacity of the charging device within charging capacities supported by electronic devices connected to the plurality of chargers and determine charging capacities allocated to the plurality of chargers. For example, in the case where the first electronic device 250-1 supports 15 W and 27 W, the second electronic device 250-2 supports 15 W, 27 W, and 60 W, and the third electronic device 250-3 supports 15 W and 27 W, when the third electronic device 250-3 is connected to the third charger 185-3 in a state where the first and electronic devices 250-1 and 250-2 are already connected to the first and second chargers 185-1 and 185-2 respectively, the controller 190 may select 15 W, 27 W, and 15 W as charging capacities of the first to third chargers 185-1, 185-2, and 185-3, respectively in consideration of the total charging capacity of 100 W of the charging device within the charging capacities of 27 W, 60 W, and 27 W supported by the first to third electronic devices 250-1, 250-2, and 250-3 connected to the first to third chargers 185-1, 185-2, and 185-3 respectively.

The controller 190 may collect information on the battery capacity of the vehicle 100 and adjust the total charging capacity of the charging device based on the collected information on the battery capacity of the vehicle 100. The controller 190 may adjust the total charging capacity of the charging device in proportion to the information on the battery capacity of the vehicle 100.

Figure 7:
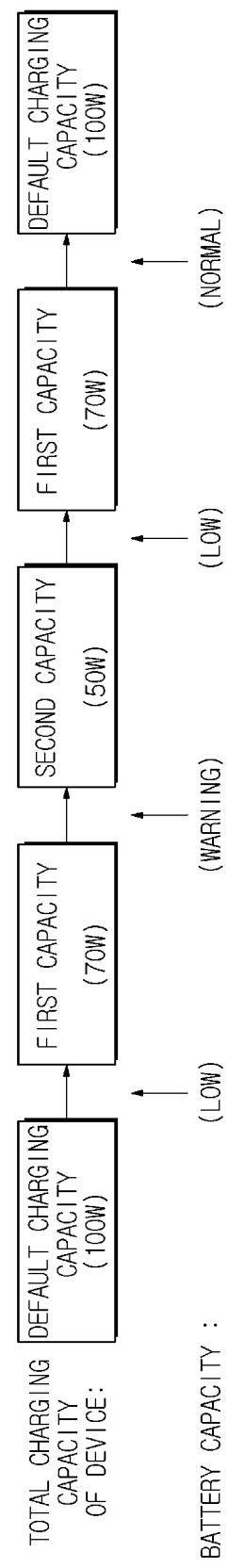
FIG. 7 is a diagram for describing a method of adjusting a total charging capacity of a charging device based on information of the battery capacity of the vehicle.

FIG. 7 is a diagram for describing a method of adjusting a total charging capacity of a charging device based on information the battery capacity of the vehicle 100.

In FIG. 7, a case in which information on the battery capacity of the vehicle 100 divided into three levels of normal, low, and warning is provided is illustrated by way of example. However, the method of providing the battery capacity information is not limited thereto and the battery capacity may also be divided into two levels or four levels in some forms of the present disclosure.

Referring to FIG. 7, the total charging capacity of the charging device may be modified and adjusted according to the battery condition of the vehicle 100. In the case where 100 W is a default charging capacity of the charging device, upon determination that the battery capacity of the vehicle 100 is in the low level based on the collected information on the battery capacity of the vehicle 100, the controller 190 may adjust the default charging capacity of 100 W to a predetermined first capacity (e.g., 70 W). Then, upon determination that the battery capacity of the vehicle 100 is in the warning level, the controller 190 may adjust the primarily adjusted first capacity to a second capacity (e.g., 50 W).

Meanwhile, when the battery of the vehicle 100 returns to the normal level based on the collected information on the battery capacity of the vehicle 100, the controller 190 may adjust the total charging capacity of the charging device to the first capacity and the default capacity stepwise.

The structure and operation principle of the charging device for vehicles and the vehicle 100 according to the present disclosure have been described above.

Next, a method of controlling the vehicle 100 in some forms of the present disclosure will be described with reference to the accompanying drawings.

Figure 8:
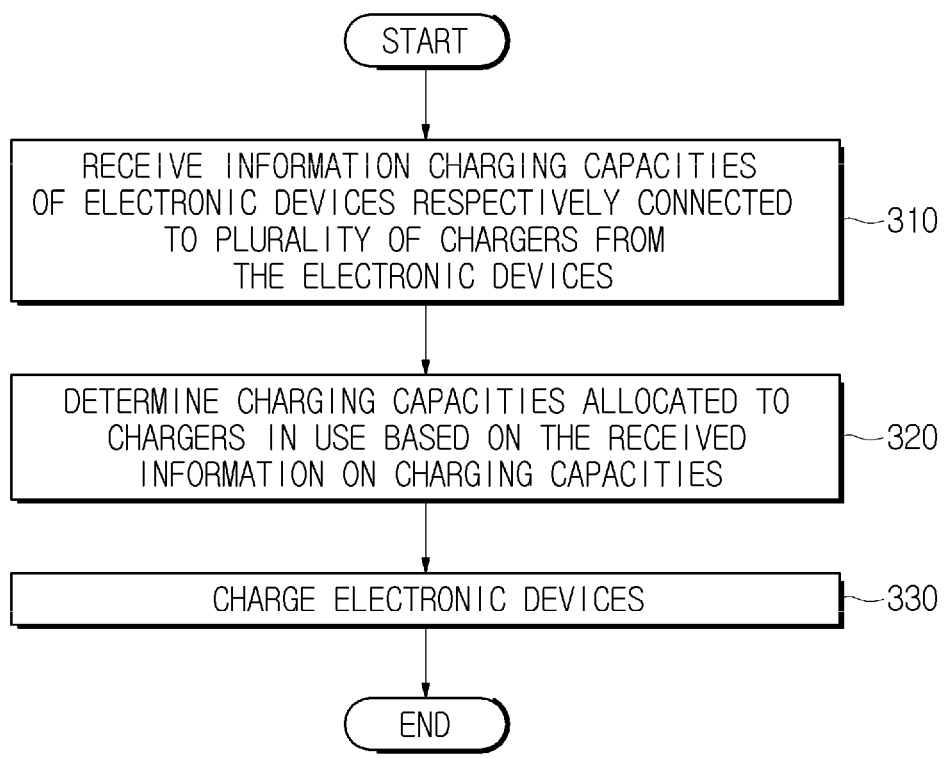
FIG. 8 is a diagram for describing a method of controlling the vehicle in one form of the present disclosure.

FIG. 8 is a flowchart for describing a method of controlling the vehicle 100 in some forms of the present disclosure.

Referring to FIG. 8, the method of controlling the vehicle 100 in some forms of the present disclosure includes receiving information on charging capacities of electronic devices connected to a plurality of chargers respectively from the electronic devices (310), determining charging capacities allocated to chargers in use based on the received information on the charging capacities (320), and performing a process of charging the electronic devices in accordance with the determined charging capacities (330)

First, the controller 190 receives information on charging capacities of the electronic devices connected to the plurality of chargers from the electronic devices (310). The plurality of chargers may be implemented using USB chargers. In this case, the electronic devices transmit information on the charging capacities thereof to the controller 190 via a USB communication pin.

Next, the controller 190 may determine charging capacities allocated to the chargers in use based on the information on the charging capacities of the electronic devices received from the electronic devices (320). In this case, the controller 190 may determine the charging capacities allocated to the chargers in use in consideration of the total charging capacity of the charging device such that a sum of charging capacities allocated to the chargers in use does not exceed the total charging capacity.

In some forms of the present disclosure, the controller 190 may adjust the total charging capacity based on the information on the battery capacity of the vehicle 100. In this case, the process of controlling the vehicle 100 may further include collecting information on the battery capacity of the vehicle 100 and adjusting the total charging capacity of the charging device based on the collected information on the battery capacity of the vehicle 100.

The principle of determining charging capacities allocated to the plurality of chargers performed by the controller 190 is as described above with reference to the controller 190. Hereinafter, descriptions given above with reference to the controller 190 will not be repeated.

Next, a process of transmitting the charging capacities determined for each of the chargers to the electronic devices is performed, and a process of charging the electronic devices is performed according to the determined charging capacities (330).

As is apparent from the above description, according to the charging device for vehicles, the vehicle, and the method of controlling the same in some forms of the present disclosure, the following effects may be obtained. First, a plurality of charging ports may be used with increased convenience of the user without increasing the manufacturing costs.

In addition, a number of charging ports as desired by the user may be provided in terms of design.

Although the charging device for vehicles, the vehicle, and the method of controlling the vehicle in some forms of the present disclosure have been shown and described, it would be appreciated by those skilled in the art that changes may be made in these forms without departing from the principles and spirit of the disclosure, the scope of which is defined in the claims and their equivalents.

What is claimed is:

1. A charging device for a vehicle, the charging device comprising:
   a plurality of chargers installed in the vehicle;
   a communication device provided in each charger of the plurality of chargers, the communication device configured to receive, from an electronic device, information regarding a charging capacity of the electronic device, wherein the electronic device is connected to each charger of the plurality of chargers; and
a controller configured to:
determine charging capacities allocated to the plurality of chargers based on the information regarding the charging capacity of the electronic device;
determine a charging capacity allocated to a charger in use among the plurality of chargers;
determine the charging capacity allocated to the charger in use based on the charging capacity of the electronic device connected to the charger in use and a total charging capacity of the charging device;
determine a charging capacity of a charger having a priority from the charger in use; and
determine that charging capacities of remaining chargers is a predetermined capacity.

2. The charging device of claim 1, wherein, when another electronic device is additionally connected to another charger of the plurality of chargers while charging capacities are allocated to at least one charger of the plurality of chargers, the controller is configured to determine the charging capacities allocated to the chargers in use based on the total charging capacity of the charging device and to manage a sum of the charging capacities allocated to the chargers in use not to exceed the total charging capacity of the charging device.

3. The charging device of claim 2, wherein the controller is configured to:
determine the charging capacities allocated to the plurality of chargers based on the charging capacities of the electronic devices when the sum of the charging capacities of the electronic devices connected to the plurality of chargers does not exceed the total charging capacity of the charging device; and
determine charging capacities allocated to the chargers in use based on the total charging capacity of the charging device to manage the sum of the charging capacities allocated to the chargers in use not to exceed the total charging capacity of the charging device when the sum of the charging capacities of the electronic devices connected to the plurality of chargers exceeds the total charging capacity of the charging device.

4. The charging device of claim 1, wherein the controller is configured to determine the charging capacities allocated to the chargers in use based on installation positions of the chargers in use.

5. The charging device of claim 1, wherein the controller is configured to determine the charging capacities allocated to the chargers in use corresponding to the charging capacities of the electronic devices connected to the chargers in use.

6. The charging device of claim 1, wherein the controller is configured to determine the charging capacities allocated to the chargers in use as a predetermined capacity.

7. The charging device of claim 1, wherein the controller is configured to:
select charging capacities based on the total charging capacity of the charging device within ranges of charging capacities supported by the electronic devices connected to the chargers in use; and
determine the charging capacities allocated to the chargers in use.

8. The charging device of claim 1, wherein the controller is configured to:
collect information regarding a battery capacity of the vehicle; and
adjust the total charge capacity of the charging device based on the information regarding the battery capacity of the vehicle.

9. The charging device of claim 8, wherein the controller is configured to adjust the total charging capacity of the charging device corresponding to the information regarding the battery capacity of the vehicle.

10. A vehicle provided with a charging device for vehicles, wherein the charging device for vehicles comprises:
a plurality of chargers installed in the vehicle;
a communication device configured to communicate with an electronic device connected to each charger of the plurality of chargers; and
a controller configured to:
determine charging capacities allocated to a charger in use among the plurality of chargers based on charging capacities of electronic devices connected to the plurality of chargers;
determine the charging capacity allocated to the charger in use among the plurality of chargers based on the charging capacities of the electronic devices connected to the plurality of chargers and a total charging capacity of the charging device;
determine a charging capacity of a charger having a priority from the charger in use; and
determine that charging capacities of remaining chargers is a predetermined capacity.

11. A method of controlling a charging device for a vehicle provided with a plurality of chargers therein, the method comprising:
receiving information regarding charging capacities of electronic devices connected to the plurality of chargers from the electronic devices; and
determining a charging capacity allocated to a charger in use among the plurality of chargers based on the information regarding the charging capacities of the electronic devices,
wherein determining the charging capacity allocated to the charger in use comprises:
determining the charging capacity allocated to the charger in use among the plurality of chargers based on the charging capacities of electronic devices connected to the plurality of chargers and a total charging capacity of the charging device;
determining a charging capacity of a charger having a priority from the charger in use; and
determining that charging capacities of remaining chargers is a predetermined capacity.

12. The method of claim 11, wherein determining the charging capacity allocated to the charger in use among the plurality of chargers based on the information on the charging capacities comprises, in a state where a charging capacity is allocated to one charger among the plurality of chargers, when another electronic device is connected to another charger, determining the charging capacity of the charger in use based on the total charging capacity of the charging device to allow a sum of the charging capacity allocated to the charger in use not to exceed the total charging capacity of the charging device.

13. The method of claim 11, wherein the method further comprises:
collecting information regarding a battery capacity of the vehicle; and
adjusting the total charging capacity of the charging device based on the information regarding the battery capacity of the vehicle.

14. The method of claim 13, wherein adjusting the total charging capacity of the charging device based on the information regarding the battery capacity of the vehicle comprises adjusting the total charging capacity of the charging device corresponding to the information regarding the battery capacity of the vehicle.

* * * * *